No. 682,276.  
F. F. RAYMOND, 2d.  
PASTE POT OR JAR.  
(Application filed May 4, 1901.)  
Patented Sept. 10, 1901.

(No Model.)

WITNESSES:
INVENTOR:

THE NORRIS PETERS CO., PHOTO-LITHO., WASHINGTON, D. C.

UNITED STATES PATENT OFFICE.

FREEBORN F. RAYMOND, 2D, OF NEWTON, MASSACHUSETTS, ASSIGNOR TO CARTER'S INK COMPANY, OF BOSTON, MASSACHUSETTS.

PASTE POT OR JAR.

SPECIFICATION forming part of Letters Patent No. 682,276, dated September 10, 1901.

Application filed May 4, 1901. Serial No. 58,738. (No model.)

*To all whom it may concern:*

Be it known that I, FREEBORN F. RAYMOND, 2d, a citizen of the United States, and a resident of Newton, in the county of Middlesex and State of Massachusetts, have invented a new and useful Improvement in Paste Pots or Jars, of which the following is a full, clear, and exact description, reference being had to the accompanying drawings, forming a part of this specification, in explaining its nature.

The invention relates to a paste pot or jar comprising two independent receptacles, one of which is adapted to hold water and the other of which to hold paste. The outer receptacle is preferably cylindrical in shape and also preferably has a cylindrical chamber formed by the inner and outer walls of the receptacle, which are connected together at the base of the receptacle and the inner wall of which forms a chamber which is open at the top and at the bottom and which is adapted to receive and hold an independent and removable receptacle. When the chamber of the outer receptacle is used for holding water, it provides, in effect, an evaporating-chamber and also a cylindrical brush well or holder, any part of which may be used for holding the brush.

In the further description of the invention reference will be had to the accompanying drawings, forming a part of this specification, in which—

Figure 1:
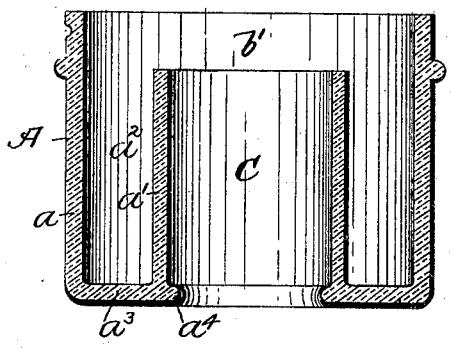
Figure 3:
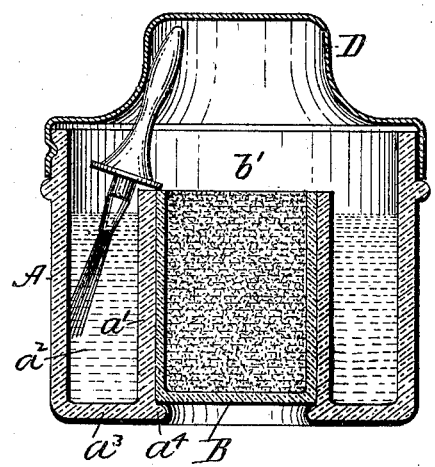
Figure 2:
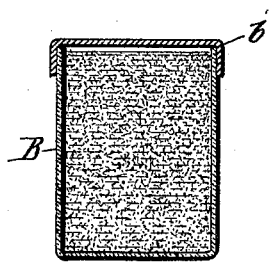
Figure 4:
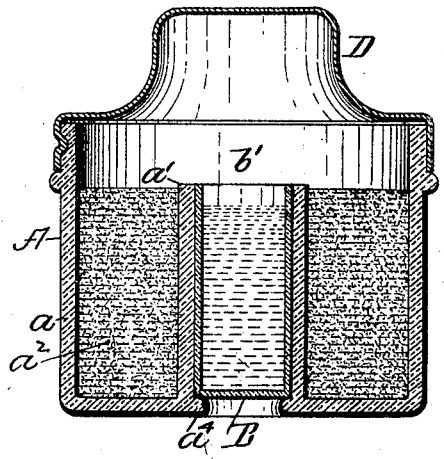

Figure 1 is a view in vertical central section of a pot or jar without the cover and without the inner receptacle. Fig. 2 is a view of the inner receptacle filled and covered. Fig. 3 is a view representing the outer and inner receptacles associated and covered, the outer receptacle containing water and the inner receptacle paste, a brush being shown in the outer receptacle. Fig. 4 is a view in vertical section representing a modification in the use of the two chambers, to which reference is hereinafter made.

Referring to the drawings, A represents the outer receptacle, and B the inner receptacle. The outer receptacle A has the outer wall $a$ and the inner wall $a'$, separated from the outer wall to form a chamber $a^2$, and which is connected to the outer wall by the base or bottom $a^3$. The inner wall surrounds an unrestricted chamber C having no bottom or top—in fact, extending entirely through the receptacle A, the said receptacle being in the nature of a cylindrical vessel without a bottom or top. The inner wall $a'$ of the receptacle is not as high as the outer wall $a$ in order that the moisture from one chamber may pass from it to the other. The receptacle may also have a rest $a^4$ for holding the vessel B.

The vessel B is of a shape to fit within the chamber C and of a height not to extend much, if any, above the wall $a'$, and it is adapted to contain paste and to form a means for the sale and transportation of the same independently of the outer receptacle, and therefore it has a cover $b$, which is removed when the vessel is placed in the chamber C. A cap D covers both the chamber $a^2$ and the vessel B when in place, but does not impede the supply of moisture to the space $b'$ between it and the chamber $a^2$ and vessel B.

I prefer that the outer chamber be used for containing water and that the independent vessel hold paste. Of course it will be possible to use the outer receptacle A for holding paste and the independent vessel B for holding water; but when so used I prefer to enlarge the chamber $a^2$ and to reduce the size of the vessel B. (See Fig. 4.)

A paste pot or jar of this construction is cheap to make and affords an abundant supply of water for the brush and for evaporation and ready means for separating the water-receptacle from the paste-holder for the purpose of renewal, as well as that of cleanliness, the central vessel being removable from the outer vessel without soiling the hands by lifting it upward from the open lower end of the outer vessel.

Having thus fully described my invention, I claim and desire to secure by Letters Patent of the United States—

1. A paste pot or jar having an outer receptacle containing a chamber open at its top and a cavity extending through its bottom, with a removable vessel held in said cavity, the top and bottom of which are both accessible while in the outer receptacle.

2. A paste pot or jar comprising a receptacle having an outer wall, an inner wall shorter than the outer wall, a bottom connecting the two walls, the inner and outer walls forming a chamber open at its top and also forming a bottomless cavity, with an independent vessel contained in said cavity and adapted to be removed from it.

FREEBORN F. RAYMOND, 2D.

Witnesses:
JOHN E. R. HAYES,
SAUL SIPPERSTEIN.